United States Patent Office 3,127,277
Patented Mar. 31, 1964

3,127,277
GLASS COMPOSITION
Ralph L. Tiede, Newark, Ohio, assignor to Owens-Corning Fiberglas Corporation, a corporation of Delaware
No Drawing. Filed Nov. 17, 1960, Ser. No. 69,812
22 Claims. (Cl. 106—50)

This is a continuation-in-part application of my copending application, Serial No. 802,630, filed March 30, 1959, now abandoned.

This invention relates to glass and glass compositions and particularly to glass compositions having exceptionally high moduli of elasticity.

It is an object to provide a great increase in modulus of elasticity of fibers over commercially available glass fibers.

It is an object of this invention to provide a glass composition having greatly improved strength properties including a high modulus of elasticity without serious loss of other properties including a requisite liquidus-viscosity relationship for fiberization.

It is a further object to provide improved glass compositions for the production of continuous or staple glass fibers in a single or multiple-hole feeder.

The glass compositions of this invention comprise silica, beryllia and usually one or more oxides of elements in Group II of the Periodic Chart of the Atoms, titania, zirconia and other modifying oxides.

The components of the glass composition are present in the following proportions expressed in weight percent.

| Ingredient: | Percent by weight |
|---|---|
| $SiO_2$ | 45–60 |
| CaO | 9–19 |
| MgO | 6–10 |
| BeO | 7–12 |
| $ZrO_2$ | 1–3 |
| $Li_2O$ | Up to 4 |
| $TiO_2$ | 2–10 |
| $CeO_2$ | Up to 4 |

The glass compositions may have other ingredients added as will be seen by an inspection of the specific compositions that follow, but the principal oxides appear in the above table. Preferred ranges of proportions are: silica 49–57% by weight, calcia 11–14%, magnesia 6–9%, beryllia 8–11%, zirconia 2–3%, lithia 0–3%, titania 4–8%, ceria 1–3%, and not more than 3% CuO, 3% $Al_2O_3$ or 3% $Fe_2O_3$, if added.

Glass compositions have been prepared and fiberized as indicated in the following examples.

Example 1

| Oxide: | Percent by weight |
|---|---|
| $SiO_2$ | 54.0 |
| CaO | 13.0 |
| MgO | 9.0 |
| BeO | 8.0 |
| $ZrO_2$ | 2.0 |
| $TiO_2$ | 8.0 |
| $Li_2O$ | 3.0 |
| $CeO_2$ | 3.0 |
| | 100.0 |

Liquidus 2062° F.
Modulus of elasticity $E=16.0 \times 10^6$.

Example 2

| Oxide: | Percent by weight |
|---|---|
| $SiO_2$ | 53.7 |
| CaO | 12.9 |
| MgO | 9.0 |
| BeO | 8.0 |
| $ZrO_2$ | 2.0 |
| $TiO_2$ | 7.9 |
| $Li_2O$ | 3.0 |
| $CeO_2$ | 3.0 |
| $Fe_2O_3$ | 0.5 |
| | 100.0 |

Liquidus 2060° F.
$E=16.1 \times 10^6$.

This composition has been found preferred with respect to high modulus of ease of fiber formation.

Example 3

| Oxide: | Percent by weight |
|---|---|
| $SiO_2$ | 52.9 |
| CaO | 12.7 |
| MgO | 8.8 |
| BeO | 10.0 |
| $ZrO_2$ | 2.0 |
| $TiO_2$ | 7.8 |
| $Li_2O$ | 2.9 |
| $CeO_2$ | 2.9 |
| | 100.0 |

Liquidus 2337° F.
$E=15.7 \times 10^6$.

Example 4

| Oxide: | Percent by weight |
|---|---|
| $SiO_2$ | 51.0 |
| CaO | 13.0 |
| MgO | 9.0 |
| BeO | 11.0 |
| $ZrO_2$ | 2.0 |
| $TiO_2$ | 8.0 |
| $Li_2O$ | 3.0 |
| $CeO_2$ | 3.0 |
| | 100.0 |

Liquidus 2385° F.
$E=16.6 \times 10^6$.

Example 5

| Oxide: | Percent by weight |
|---|---|
| $SiO_2$ | 54.0 |
| CaO | 13.0 |
| MgO | 6.0 |
| BeO | 11.0 |
| $ZrO_2$ | 2.0 |
| $TiO_2$ | 8.0 |
| $Li_2O$ | 3.0 |
| $CeO_2$ | 3.0 |
| | 100.0 |

Liquidus 2440° F.
$E=16.1 \times 10^6$.

Example 6

| Oxide: | Percent by weight |
|---|---|
| $SiO_2$ | 49.9 |
| CaO | 12.8 |
| MgO | 8.8 |
| BeO | 10.8 |
| $ZrO_2$ | 2.0 |
| $TiO_2$ | 4.9 |
| $Li_2O$ | 2.9 |
| $CeO_2$ | 2.9 |
| $Al_2O_3$ | 5.0 |
| | 100.0 |

Liquidus 2540° F.
$E = 16.3 \times 10^6$.

Example 7

| Oxide: | Percent by weight |
|---|---|
| $SiO_2$ | 50.9 |
| CaO | 11.7 |
| MgO | 8.1 |
| BeO | 9.9 |
| $ZrO_2$ | 2.8 |
| $TiO_2$ | 7.0 |
| $Li_2O$ | 2.7 |
| $CeO_2$ | 2.7 |
| $Al_2O_3$ | 4.2 |
| | 100.0 |

Liquidus 2527° F.
$E = 16.3 \times 10^6$.

Example 8

| Oxide: | Percent by weight |
|---|---|
| $SiO_2$ | 51.0 |
| CaO | 13.0 |
| MgO | 9.0 |
| BeO | 11.0 |
| $ZrO_2$ | 2.0 |
| $TiO_2$ | 5.0 |
| $CeO_2$ | 3.0 |
| CuO | 3.0 |
| $Al_2O_3$ | 3.0 |
| | 100.0 |

Liquidus 2600° +F.

Example 9

| Oxide: | Percent by weight |
|---|---|
| $SiO_2$ | 54.0 |
| CaO | 13.0 |
| MgO | 9.0 |
| BeO | 8.0 |
| $ZrO_2$ | 2.0 |
| $TiO_2$ | 8.0 |
| $Li_2O$ | 3.0 |
| CuO | 3.0 |
| | 100.0 |

Liquidus 1987° F.

Example 10

| Oxide: | Percent by weight |
|---|---|
| $SiO_2$ | 54.0 |
| CaO | 13.0 |
| MgO | 9.0 |
| BeO | 8.0 |
| $ZrO_2$ | 2.0 |
| $TiO_2$ | 8.0 |
| $Li_2O$ | 3.0 |
| $Fe_2O_3$ | 3.0 |
| | 100.0 |

Liquidus 2072° F.

As can be seen in the examples, the compositions are chiefly silica with at least one oxide of an element from group II of the periodic table for raising the modulus and other oxides including those of zirconium, titanium, lithium, cerium, copper, aluminum, and iron.

The group II element is preferably a low molecular weight member of the group; beryllia is preferred over magnesia and calcia. These oxides contribute to elevation of the modulus of elasticity of the glass compositions. Although beryllia is believed to be the better modulus improver, it has been found that beryllia should not normally be the only group II oxide added because the liquidus of the composition also raises with an addition of more than a few percent of beryllia. Therefore, the addition of beryllia is usually accompanied by the addition of magnesia or calcia or both magnesia and calcia. At least one of the group II oxides is added to these compositions for the purpose of raising the modulus of elasticity.

Ceria is added to each of the compositions to lower the liquidus of the glass without lowering the modulus of elasticity and to promote continuous formation of fibers. It is desirable to obtain a low liquidus temperature but this must be done with no appreciable loss in modulus. An addition of sodium oxide or potassia will usually lower the liquidus but such an addition also lowers the modulus of elasticity which, of course, is undesirable and these group I oxides are not used for this reason. Lithia can be tolerated and is generally added as a flux.

The liquidus temperature is preferably low; however, the viscosity-temperature relationship is of utmost importance when it is desirable to fiberize the glass compositions. It is desirable to have a reasonably high viscosity at the liquidus temperature. The glass composition when held at a temperature high enough to prevent devitrification must have a high enough viscosity to allow fiberization. A too "watery" condition of the glass makes it impossible to pull fibers.

Iron oxide, when added in small proportions, has been found beneficial to formation of continuous fibers. It is a recognized fact that continuous forming is benefited by the addition of iron oxide but the exact reason or reasons have not been determined. Iron oxide is not the full equivalent of ceria since it does not have identical effects on liquidus; however, if proportions of up to 3% $Fe_2O_3$ are used, little or no ceria need be added as far as continuous fiber formation is concerned.

Conventional fiber forming processes comprise flowing a stream of molten glass from a source thereof. This stream of molten glass is then attenuated into fibers by introducing the stream into a blast of gas or by mechanically pulling the stream with a suitable pulling device. As the glass is attenuated, solidification takes place and fine diameter fibers are produced. Steam blowers (Kleist et al. 2,287,006) or gas-air burners (Stalego 2,481,543) are used to provide a blast in some of the processes known in the art. Collet winders (Beach 2,391,870) and pulling wheels (Slayter et al. 2,729,027) are used as devices for mechanically attenuating fibers.

In accordance with one of the special fiber-forming methods, the glass compositions are brought to a temperature sufficiently above the liquidus to insure little likelihood of devitrification during fiber-forming and then the removal of heat from the glass during fiber formation is controlled by the use of cooling devices disposed about the orifices through which the molten glass emits in the form of a stream. For instance, in conjunction with molten glass feeders having a plurality of orifices disposed in an equal number of tips, fin or tube cooling devices have been used, see Russell Re. 24,060. By such means heat is controllably removed from the stream or streams of molten glass to allow very "watery" glasses to be handled and prevent devitrification during the fiber-forming operation. The removal of heat by cooling devices is in addition to the rapid cooling inherently present in fiber-forming processes because of the rapid increase in the surface area to total volume relationship which takes place in the glass as it is fiberized.

Blowing processes and/or centrifugal processes (Stalego et al. 2,609,566) are especially adapted for forming fibers of glass compositions which are fiberized only with great difficulty.

In one suitable forming method, fibers are blown onto a drum and a veil or web of fibers is drafted from the drum by passing the veil through an air turbine or other suitable device, see Tucker et al. 2,264,345.

The viscosity-temperature relationship is an important physical property with respect to fiber forming. The relationship between temperature and viscosity in the pertinent range is commonly determined by the rotating cylinder method. The glass is held in a suitable container in a furnace in which it can be heated to the desired temperature. The torque required to rotate a spindle immersed in the molten glass at a constant speed is measured and may be converted to viscosity, usually expressed in poises. The relationship between viscosity and temperature may be determined by making measurements at several different temperatures. It is often convenient to plot this data in the form of a curve of the logarithm of viscosity versus temperature. After determining the liquidus of the glass, the viscosity at the liquidus can be determined from such a curve. The greater the viscosity at the liquidus, the less likely it will be that devitrification will interfere with fiber formation in the fiber forming operation.

The log viscosity-temperature relationship for the compositions of Examples 1 and 2 are as follows:

| Log Viscosity | Temperature, °F. | |
|---|---|---|
| | Example 1 | Example 2 |
| 2.25 | | |
| 2.00 | 2,120 | 2,120 |
| 1.75 | 2,185 | 2,195 |
| 1.50 | 2,260 | 2,275 |
| 1.25 | 2,355 | 2,375 |
| 1.00 | 2,470 | 2,495 |
| 0.75 | | |

Both of these glass compositions have satisfactory viscosity-temperature relations for ease of fiber forming. Both glasses were easily fiberized from a one-hole bushing and from a multi-hole bushing.

The glass compositions of the examples have moduli of elasticity of 15 to $16 \times 10^6$ or greater. They are high strength glasses especially suited for the production of glass fibers. The modulus values given are for fibers. The same glass in a massive form has a modulus from 1 to 4 million higher than the modulus of the fiber.

Modifications and variations within the scope of the appended claims are included.

I claim:
1. Glass composition consisting essentially by weight from 45–60% silica, 9–19% calcia, 6–10% magnesia, 7–12% beryllia, 1–3% zirconia, up to 4% lithia, 2–10% titania, and from 1–3% ceria.
2. Glass composition consisting essentially by weight from 49–57% silica, 11–14% calcia, 6–9% magnesia, 8–11% beryllia, 2–3% zirconia, 0–3% lithia, 4–8% titania, 1–3% ceria, and at least one oxide from the group consisting of copper oxide, alumina and iron oxide, the latter oxides being used in proportions of up to 3% copper oxide, up to 5% alumina and up to 3% $Fe_2O_3$.
3. Glass composition consisting essentially of 54% silica, 13% calcia, 9% magnesia, 8% beryllia, 2% zirconia, 8% titania, 3% lithia, and 3% ceria, all percentages being by weight.
4. Glass composition consisting essentially of 53.7% silica, 12.9% calcia, 9.0% magnesia, 8.0% beryllia, 2.0% zirconia, 7.9% titania, 3.0% lithia, 3.0% ceria, and 0.5% iron oxide, all percentages being by weight.
5. Glass composition consisting essentially of 52.9% silica, 12.7% calcia, 8.8% magnesia, 10% beryllia, 2% zirconia, 7.8% titania, 2.9% lithia, and 2.9% ceria, all percentages being by weight.
6. Glass composition consisting essentially of 51% silica, 13% calcia, 9% magnesia, 11% beryllia, 2% zirconia, 8% titania, 3% lithia, and 3% ceria, all percentages being by weight.
7. Glass composition consisting essentially of 54% silica, 13% calcia, 6% magnesia, 11% beryllia, 2% zirconia, 8% titania, 3% lithia, and 3% ceria, all percentages being by weight.
8. Glass composition consisting essentially of 49.9% silica, 12.8% calcia, 8.8% magnesia, 10.8% beryllia, 2% zirconia, 4.9% titania, 2.9% lithia, 2.9% ceria, and 5% alumina, all percentages being by weight.
9. Glass composition consisting essentially of 50.9% silica, 11.7% calcia, 8.1% magnesia, 9.9% beryllia, 2.8% zirconia, 7% titania, 2.7 lithia, 2.7 ceria, and 4.2% alumina, all percentages being by weight.
10. Glass composition consisting essentially of 51% silica, 13% calcia, 9% magnesia, 11% beryllia, 2% zirconia, 5% titania, 3% ceria, 3% copper oxide, and 3% alumina, all percentages being by weight.
11. Glass composition consisting essentially of 54% silica, 13% calcia, 9% magnesia, 8% beryllia, 2% zirconia, 8% titania, 3% lithia, and 3% copper oxide.
12. Glass composition consisting essentially of 54% silica, 13% calcia, 9% magnesia, 8% beryllia, 2% zirconia, 8% titania, 3% lithia, and 3% iron oxide.
13. Glass fibers consisting of the glass composition of claim 3.
14. Glass fibers consisting of the glass composition of claim 4.
15. Glass fibers consisting of the glass composition of claim 5.
16. Glass fibers consisting of the glass composition of claim 6.
17. Glass fibers consisting of the glass composition of claim 7.
18. Glass fibers consisting of the glass composition of claim 8.
19. Glass fibers consisting of the glass composition of claim 9.
20. Glass fibers consisting of the glass composition of claim 10.
21. Glass fibers consisting of the glass composition of claim 11.
22. Glass fibers consisting of the glass composition of claim 12.

References Cited in the file of this patent

UNITED STATES PATENTS

| 2,219,332 | Pirani | Oct. 29, 1940 |
| 2,640,784 | Tiede et al. | June 2, 1953 |
| 2,685,526 | Labino | Aug. 3, 1954 |
| 2,756,158 | Hahn et al. | July 24, 1956 |
| 2,772,987 | Whitehurst et al. | Dec. 4, 1956 |
| 2,877,124 | Welsch | Mar. 10, 1959 |
| 2,978,341 | Bastian et al. | Apr. 4, 1961 |

FOREIGN PATENTS

| 124,553 | Australia | June 26, 1947 |